June 27, 1944.  R. W. KRITZER  2,352,485
UNIT HEATER
Filed Oct. 10, 1940  3 Sheets-Sheet 2
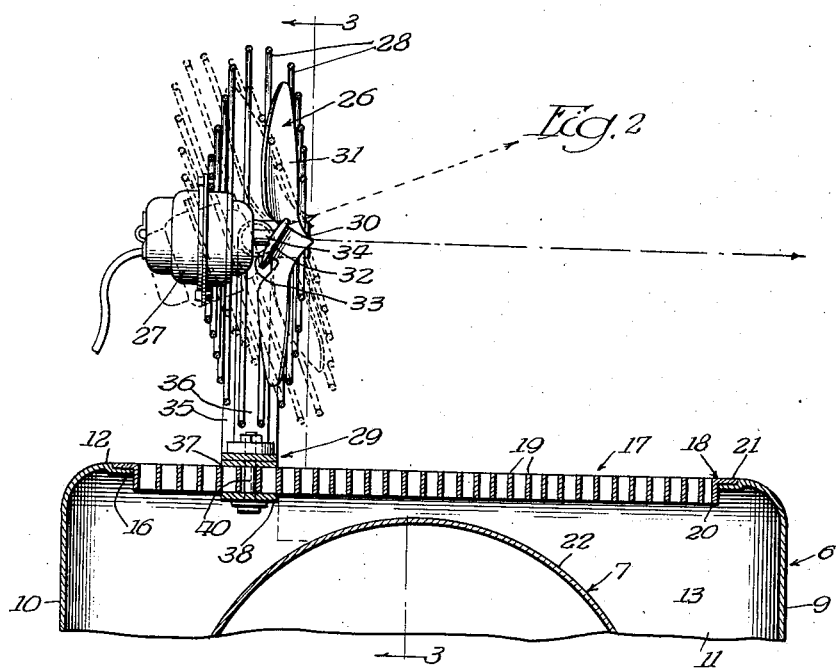
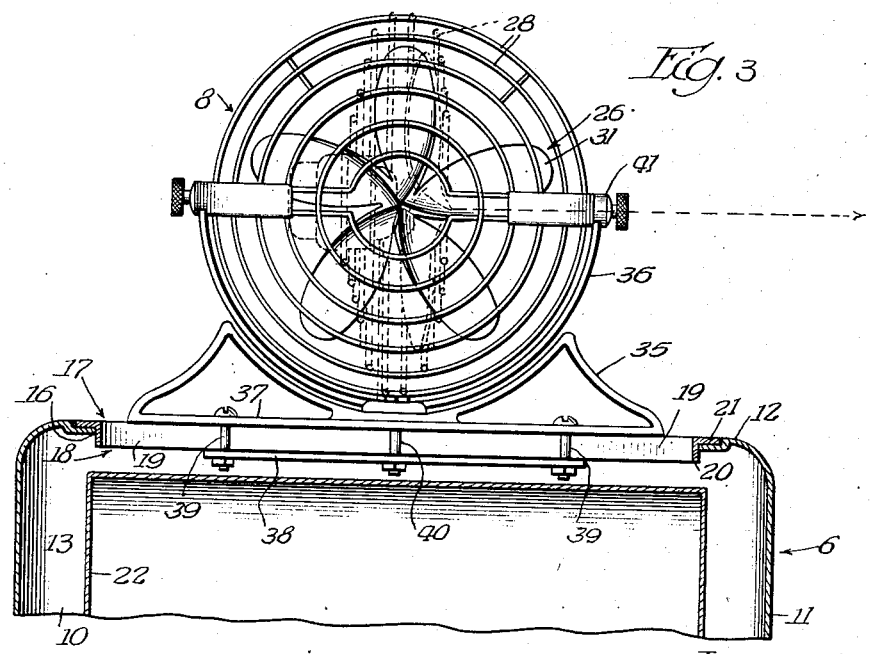
Inventor
Richard W. Kritzer
By Fred Gerlach
Atty.

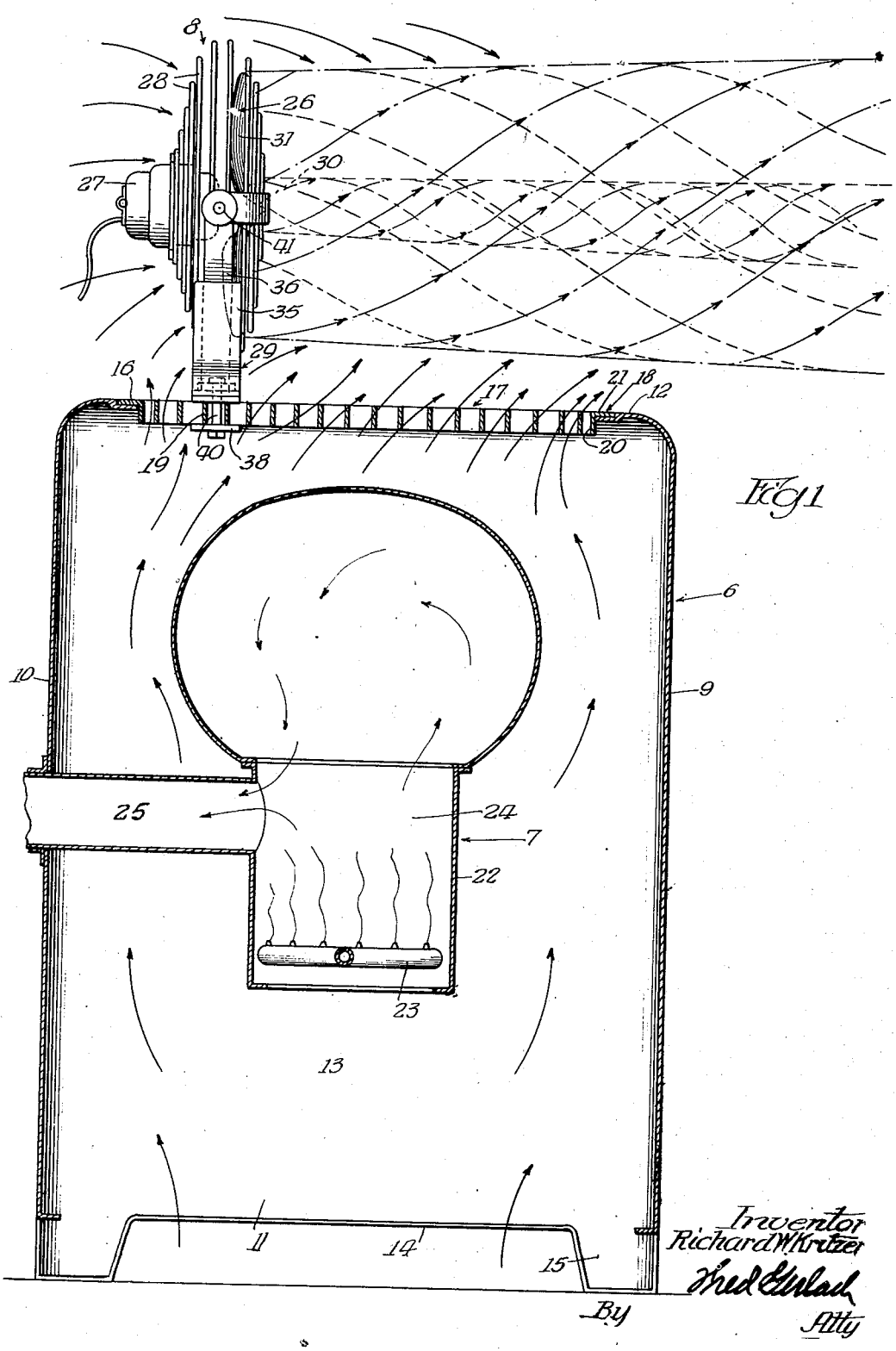

June 27, 1944.  R. W. KRITZER  2,352,485
UNIT HEATER
Filed Oct. 10, 1940  3 Sheets-Sheet 3

Inventor
Richard W. Kritzer
By Fred Gerlach, Atty.

Patented June 27, 1944

2,352,485

UNITED STATES PATENT OFFICE 2,352,485

UNIT HEATER

Richard W. Krit  r, Chicago, Ill.

Application October 10, 1940, Serial No. 360,530

5 Claims. (Cl. 98—38)

The present invention relates generally to unit heaters. More particularly the invention relates to that type of unit heater which is designed or adapted to be placed and used in a room to be heated and as its principal parts comprises— (1) a box-like casing which has an air inlet at the bottom thereof and in addition a grill equipped outlet in its top and is adapted to have air enter its interior via the inlet and then flow upwards to and through the outlet, and (2) a heating device which is disposed in the casing and serves when in operation to heat the air as it circulates or flows upwardly through the casing.

One object of the present invention is to provide a unit heater of this type which is more efficient than, and has certain advantages over, previously designed heaters of the same general character by reason of the fact that it includes as one of the parts thereof an air circulator which is mounted over the grill for the air outlet in the top of the casing and serves when in operation to increase the circulation of air through the casing and to direct the heated air emanating from the top of the casing in beam form across the room in which the heater is located.

Another object of the invention is to provide a unit heater of the last mentioned character in which the air circulator is carried by the grill and has a mount therefor whereby it may be adjusted universally in order to direct the beam of heated air toward any desired or preferred point in the room to be heated.

A further object of the invention is to provide a unit heater of the type and character under consideration in which the air circulator is located directly over the grill and inwards from the frame of the latter to the end that the suction which is created behind the fan wheel during operation of the circulator produces an up-draft in the casing and thus stimulates the circulation of air through the casing and past the heating device.

A still further object of the invention is to provide a unit heater which is generally an improvement in the art and is characterized by low cost of manufacture, high efficiency and practicability.

Other objects of the invention and the various advantages and characteristics of the present unit heater will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a vertical section of a unit heater embodying one form of the invention;

Figure 2 is a fragmentary side view of the unit heater of Figure 1, illustrating the manner in which the air circulator is mounted so that it may be adjusted into different angular positions about a horizontal axis;

Figure 3 is a fragmentary vertical transverse section taken on the line 3—3 of Figure 2 and showing the manner in which the air circulator is mounted so that it is capable of being swung or adjusted laterally about a vertical axis;

Figure 4:
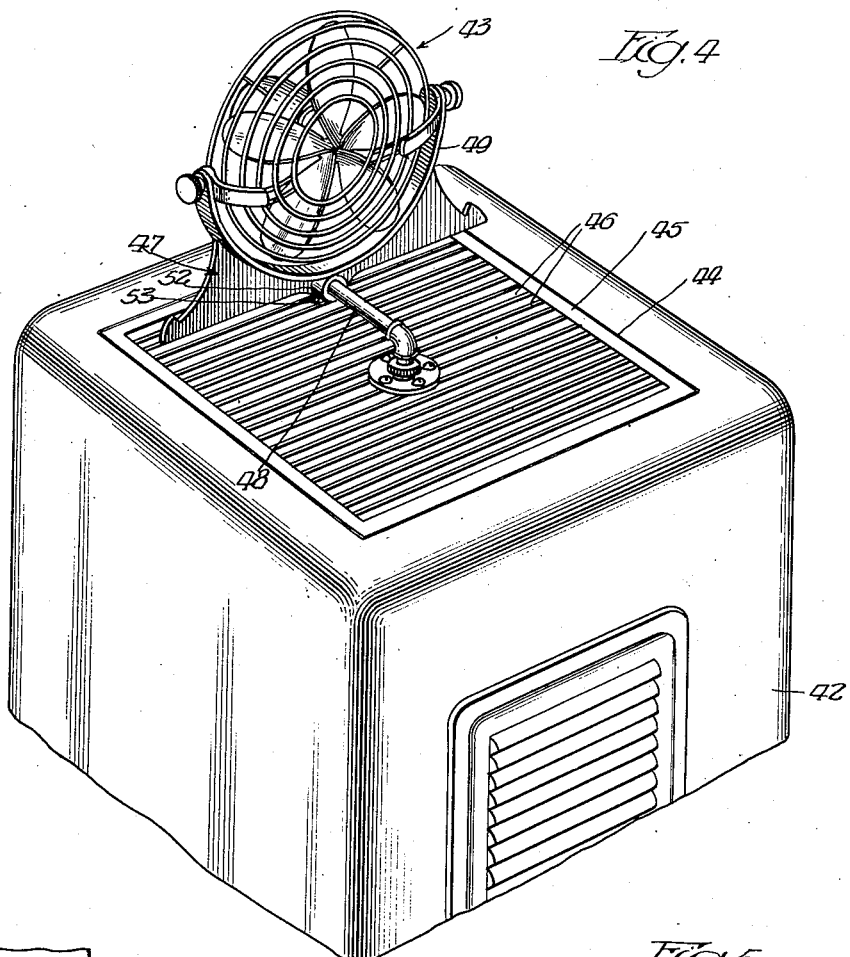
Figure 4 is a fragmentary perspective of a unit heater embodying another form or embodiment of the invention.

The unit heater which is shown in Figures 1, 2 and 3 of the drawings constitutes one embodiment of the invention. It is designed or adapted for use in a room to be heated and comprises a box-like or cabinet type casing 6, a heating device 7 and an air circulator 8.

The casing 6 is in the form of a sheet metal shell or cabinet and comprises a front 9, a back 10, a pair of sides 11 and a top 12. The sides are disposed in parallel relation and extend between, and are joined to, the side margins of the front and back. They serve to hold the front and back in spaced relation and together with the latter define a chamber 13. The bottom margins of the front, back and sides of the casing 6 define an air inlet 14 for the chamber 13. Legs 15 are provided at the lower corners of the casing and these legs serve to hold the casing in an elevated position with respect to the floor on which the heater is positioned or placed with the result that the air inlet is in communication with the air in the bottom portion of the room to be heated. The top 12 is marginally connected to the upper margins of the front, back and sides of the casing and has in the central portion thereof a rectangular opening forming an air outlet 16 for the chamber 13. A grill 17 extends across the outlet 16. This grill is removable from the casing in order to provide access to the chamber 13 and consists of a rectangular frame 18 of angle bar form and a series of cross strips 19. The frame extends horizontally and comprises a vertically extending flange 20 and a horizontally extending flange 21. The flange 21 projects outwards from the upper margin of the flange 20 and rests loosely on the portion of the casing top 12 which defines the air outlet 16. The vertical flange 20 of the grill frame 18 fits within the outlet 16 and serves when the grill is in place to hold the grill against horizontal displacement relatively to the top 12 of the heater casing. The cross strips 19 are arranged in parallel relation. They are spaced equidistantly apart and have their ends welded or otherwise fixedly secured to the side parts of the frame 18. When the heater is in operation, as hereinafter described, air enters the chamber 13 in the casing 6 via the air inlet 14, then flows upwards through the chamber and is discharged back into the room through the space between the cross strips 19 of the grill 17. The grill 17 is adapted to be removed merely by raising it out of seated relation with the casing top 12.

The heating device 7 is located in the central portion of the chamber 13 and consists of a metallic shell 22 and a burner 23. The shell defines a combustion chamber 24 and embodies a flue 25. The latter extends through the back 10 of the heater casing 6 to a point outside the room to be heated and serves to discharge or carry away the products of combustion resulting from operation of the burner 23. The latter is shown diagrammatically in Figure 1 and may be an oil burner or a gas burner. When the burner 23 is in operation it serves to heat the shell 22 and the latter in turn heats the air as it circulates upwards through the chamber 13 in the casing 6.

The air circulator 8 is disposed over the rear portion of the grill 17, as shown in Figures 1 and 2 of the drawings, and comprises a fan wheel 26, an electric motor 27, a guard 28 and a mount 29. The fan wheel, motor and guard are in the form of an assembly, and as hereinafter described, are so carried or supported by the mount 29 that they are bodily adjustable into different angular positions. The fan wheel 26 is disposed within the guard 28 and consists of an elongated hub 30 and a plurality of blades 31. The hub has a pyramidal front end and embodies a socket (not shown) in its rear end. The blades 31 are formed integrally with, and project radially from, the front end of the hub. They are angularly disposed or arranged and embody front pressure faces 32 and rear suction faces 33. Preferably the fan wheel is like that which is shown in, and forms the subject matter of, United States Patent No. 1,933,948. The electric motor 27 is located behind the hub 30 of the fan wheel and is axially aligned therewith. It serves as the driving mediums for the fan wheel and embodies an armature shaft 34 which extends into the socket in the rear end of the fan wheel hub 30 and is keyed or otherwise fixedly secured to the hub. When the motor 27 is in operation it serves to drive the fan wheel 26 and during drive or operation of the fan wheel the suction faces 33 draw inwards the air surrounding the motor 27 and deliver such air into the path of the pressure faces 32 and the latter project or propel the air forwards in beam or stream form. The guard 28 is formed of wire and surrounds the fan wheel and the motor. It operates as a protecting device in that it serves to prevent objects from being brought at random in contact or engagement with the blades 31 of the fan wheel. The central portion of the casing of the motor is secured to the rear portion of the guard, as shown in Figure 1. The mount 29 of the air circulator supports the assembly of fan wheel, motor and guard so that it is adjustable universally and as its parts embodies a bracket 35 and a U-shaped member 36. The bracket 35 overlies, and extends transversely across, the rear portion of the grill 17 and comprises a flat base strip 37. The latter extends between the side parts of the grill frame 18 and is positioned a short distance in front of the rear part of the frame. It is supported on the subjacent cross strips 19 of the grill and clamped in place by means of a bottom strip 38 and a pair of bolts 39. The bottom strip underlies the base strip 37 of the bracket 35 and fits against the superjacent or superincumbent cross strips 19. The bolts 39 extend through the under portions of the base strip 37 and the bottom strip 38, as shown in Figure 3 and thus maintain the bracket 35 in clamped relation with the grill. The U-shaped member 36 is located directly above the bracket 35 and serves as a connecting medium between the bracket and the aforementioned assembly. A vertically extending pivot bolt 40 extends through the central portion of the base strip 37 of the bracket and the central portion of the U-shaped member 36 and forms a pivotal connection whereby the U-shaped member, together with the assembly of fan wheel, motor and guard, is permitted to be rotated or turned about a vertical axis, as illustrated in Figure 3. The pivotal connection which is afforded by the pivot bolt 40 permits the U-shaped member and assembly to be adjusted or swung throughout 360° and is of such character that the member and assembly tend to remain in the various positions into which they are adjusted or turned. The upper ends of the U-shaped member 36 are connected by pivotal connections 41 to diametrically opposite side portions of the guard 28. Such pivotal connections are horizontally aligned and permit the assembly of fan wheel, motor and guard to be tilted on a horizontal axis throughout 360°. By reason of the fact that the assembly is rotatable about a vertical axis and a horizontal axis it may be universally adjusted. When the fan wheel 26 of the air circulator 8 is in operation while the burner of the heating device 7 is energized or working it directs the heated air emanating from the air outlet 16 in beam form away from the casing 6, as shown by arrows in Figure 1. When the air circulator is vertically positioned, as shown in Figure 2, the fan wheel when driven creates a certain amount of suction tending to stimulate the circulation of the heated air upwards through the casing and directs the heated air in a horizontal beam. By rotating the assembly of fan wheel, motor and guard about the pivot bolt 40 the direction of the beam may be changed. Should it be desired to direct the beam of heated air upwards it is only necessary to tilt the assembly by adjusting or swinging it, as shown in dotted lines in Figure 2. By including the air circulator as part of the unit heater the efficiency of the heater as a whole is materially increased and it is possible to obtain an extremely practical and efficient distribution of the heated air which rises upwards through the grill 17. By having the circulator disposed a slight distance forwards of the rear part of the frame of the grill the circulator when in a vertical position, or in an upwardly tilted position, not only directs the heated air in beam form across the room to be heated but also sucks or draws the heated air upwards from the chamber 13 and hence materially stimulates air circulation through the casing and past the heating device 7. The circulator and grill being in the form of a unit may be manufactured and sold as a replacement unit for a standard or conventional unit heater having a plain grill. When the heating device 7 is inoperative or is not required for room heating purposes the circulator 8 may be used as a medium for circulating the air in the room in which the heater is disposed.

The heater of Figures 1, 2 and 3 may be manufactured at a low and reasonable cost and is characterized by the fact that it includes an air circulator whereby the heated air emanating from the air outlet may be directed in beam form to any desired part of the room to be heated.

Figure 5:
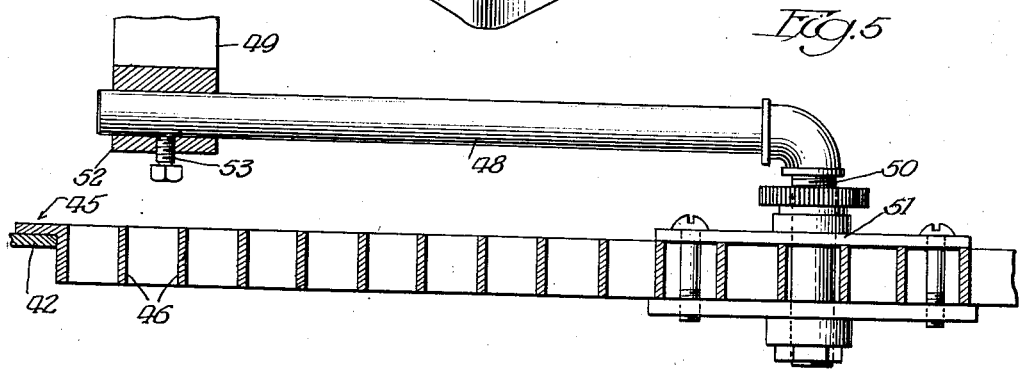
Figure 5 is a detail section illustrating the construction and design of the air circulator mount of the unit heater of Figure 4.

The unit heater which is shown in Figures 4 and 5 constitutes a second form or embodiment of the invention. It comprises a casing 42 and an air circulator 43 and is like the unit of Figures 1, 2 and 3 except for the mount for the circulator. The casing 42 houses a heating device (not shown) and has in the top thereof an air outlet 44. The latter is bridged by a grill 45 which corresponds in design and construction to the grill 17 of the unit heater of Figures 1, 2 and 3 and embodies a plurality of laterally spaced parallel cross strips 46. The air circulator 43 comprises an assembly of fan wheel, motor and guard and in addition comprises a mount 47. The latter comprises a horizontally extending pivot arm 48 and a U-shaped member 49. One end of the pivot arm is disposed over the central portion of the grill 45 and embodies a depending spindle 50. The latter extends through, and is journalled in, a bearing bracket 51 on the central portion of the grill and permits the arm 48 to be swung about a vertical axis. The U-shaped member 49 of the air circulator mount 47 extends around the circulator, as shown in Figure 4, and embodies at the central portion thereof a sleeve-like element 52. The latter is slidably mounted on the distal end of the pivot arm 48 and has a set screw 53 for releasably holding it in place. When the set screw is released the U-shaped member may be adjusted on the pivot arm either to or from the spindle 50. The ends of the member 49 are connected to diametrically opposite portions of the guard of the air circulator assembly so that such assembly is free to be adjusted throughout 360° about a horizontal axis. The mount 47 permits the assembly of fan wheel, motor and guard to be universally adjusted and hence it is possible during operation of the circulator 43 to direct the beam of heated air toward any given or desired point in the room to be heated. When it is desired horizontally to adjust the circulator it is only necessary to swing the pivot arm 48 relatively to the bearing bracket 51. The unit heater of Figures 4 and 5 operates or functions in the same manner as the heater of Figures 1, 2 and 3.

The invention is not to be understood as restricted to the details set forth since these may be modified within the scope of the appended claims without departing from the spirit and scope of the invention.

Having thus described the invention what I claim as new and desire to secure by Letters Patent is:

1. The combination with a box or cabinet-like casing adapted to have air circulate through it and provided with an air outlet in one exterior wall thereof, of a grill mounted on said one exterior wall of the casing and extending across said outlet, and a wholly unenclosed air circulator adapted to propel away from the casing the air emanating from the outlet, positioned adjacent and outwardly of the grill, and comprising an assembly of fan wheel and electric motor and a mount for the assembly anchored directly to the grill.

2. The combination with a box or cabinet-like heater casing adapted to have air circulate through it and provided with an air outlet in one of the exterior walls thereof, of a grill mounted removably on said one exterior wall of the casing and normally extending across said outlet, and a fully exposed air circulator adapted to propel the circulated air in beam form away from the casing after it emanates from the grill, positioned wholly outside of the casing and adjacent and outwardly of the grill, and comprising an assembly of fan wheel and electric motor and a mount for the assembly anchored directly to the grill and designed to permit the assembly to be adjusted into different angular positions for beam regulating or adjusting purposes.

3. The combination with a box or cabinet-like casing adapted to have air circulate upwardly through it and provided at the upper end thereof with a horizontal top embodying an upwardly facing air outlet therein and having its top face fully exposed, of a grill mounted on the top of said casing and extending across said outlet, and a wholly unenclosed air circulator adapted to propel the circulated air away from the casing after it emanates from the outlet, positioned above the grill and inwardly of the latter's margins, and comprising an assembly of fan wheel and electric motor and a mount for the assembly anchored directly to the grill and designed to permit the assembly to be adjusted into different angular positions for beam regulating or adjusting purposes.

4. The combination with a box or cabinet-like casing adapted to have air circulated upwardly through it and provided at the top thereof with an air outlet, of a grill mounted on the top of said casing and extending across said outlet, an assembly of fan wheel and electric motor positioned directly above the grill and adapted when in operation to direct the circulated air in beam form away from the casing after it passes through the outlet and grill, and a mount for the assembly embodying a horizontally extending arm having one end thereof pivotally connected to the central portion of the grill so that it is free to swing in a horizontal plane, and a bracket type element between the distal end of the arm and the assembly.

5. The combination with a box or cabinet-like casing adapted to have air circulated upwardly through it and provided at the top thereof with an air outlet, of a grill mounted on the top of said casing and extending across said outlet, an asesmbly of fan wheel and electric motor positioned directly above the grill and adapted when in operation to direct the circulated air in beam form away from the casing after it passes through the outlet and grill, and a mount for the assembly embodying a horizontally extending arm having one end thereof pivotally connected to the central portion of the grill so that it is free to swing in a horizontal plane, and an assembly supporting bracket element slidably mounted on the distal end of the arm.

RICHARD W. KRITZER.